United States Patent Office 2,715,628
Patented Aug. 16, 1955

2,715,628
THIOPHENE DERIVATIVES

Arthur Stoll, Arlesheim, and Jean-Pierre Bourquin, Basel, Switzerland, assignors to Sandoz A. G., Basel, Switzerland No Drawing. Application June 21, 1954,
Serial No. 438,335

3 Claims. (Cl. 260—293.4)

The present invention relates to thiophene derivatives of the formula

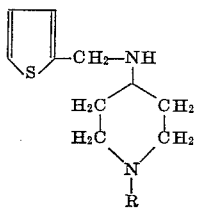

wherein R stands for methyl or ethyl, and to the preparation thereof.

In accordance with the present invention, the new compounds are prepared by condensing the corresponding N-alkyl-4-amino-piperidine with a 2-thenyl-halide. The condensation is advantageously carried out by dissolving the N-alkyl-4-amino-piperidine in a solvent such, for example, as benzene, toluene, xylene, chlorobenzene or the like, and then stirring the solution with a 2-thenyl-halide at room temperature (about 20° to about 30° C.) or at raised temperature. The reaction may be carried out with or without a condensing agent, such for example as an alkali carbonate.

The thus-obtained thiophene derivatives are colorless, very mobile liquids which can be distilled in a high vacuum without decomposition. They are useful as antioxidants, and also as intermediates for the preparation of therapeutically useful compounds. Thus, by condensation thereof with a halogenated benzene, the corresponding heterocyclic piperidine derivative of the formula

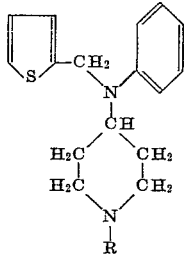

is obtained. R, in the last-indicated formula, has the same significance as in the first-indicated formula. The condensation is preferably carried out in the presence of a condensing agent such as an alkali carbonate and, if desired, in an organic solvent medium. The said heterocyclic piperidine derivatives possess excellent antihistaminic activity and, when administered for example orally, are characterized by low toxicity and good compatibility (freedom from undesired side reactions).

The following examples set forth presently-preferred representative embodiments of the invention. These examples are intended to be solely illustrative and not at all restrictive. In the examples, the parts are by weight unless otherwise indicated; parts by weight bear the same relation to parts by volume, in this connection, as do grams to milliliters. Temperatures are in degrees centigrade.

Example 1

204 parts of 1-methyl-4-amino-piperidine (1 mol) are dissolved in the five-fold quantity of benzene and, while stirring, the resultant solution is added dropwise at room temperature and in the course of five minutes to a solution of 240 parts of 2-thenyl-chloride (1 mol) in the like quantity of benzene. The reaction temperature rises slowly from 20° to about 30°, and the clear solution becomes cloudy. After 1 to 2 days, the reaction mixture is shaken out three times with a total of 1000 parts by volume of water, without removing the precipitated hydrochloride. The aqueous extract which is weakly alkaline toward phenolphthalein is rendered strongly alkaline by the addition of 35 parts by volume of 3-normal aqueous caustic soda, and is then evaporated down to a syrupy consistency at a bath temperature of 90° and under the reduced pressure of a water-jet vacuum pump. The residue from the evaporation is dissolved in 700 parts by volume of absolute ethanol, and the solution evaporated down as far as possible under the reduced pressure of a water-jet vacuum pump. After again repeating this operation with the same quantity of absolute ethanol, the residue from the evaporation is dissolved in 1100 parts by volume of absolute ethanol, precipitated sodium chloride is removed by filtration, and the filtrate admixed with a solution of 50.0 parts of sodium in 800 parts by volume of absolute ethanol, whereby additional quantities of sodium chloride precipitate and are removed by suction filtration. The alcoholic solution of the free base is evaporated down as far as possible under the reduced pressure of a water-jet vacuum pump at a bath temperature of 50°, after which the residue from the evaporation is digested cold in 1500 parts by volume of acetone, and the whole filtered thereby removing the rest of the sodium chloride and the small excess of sodium ethylate. The filtrate is evaporated under the vacuum of a water-jet vacuum pump at a bath temperature of 50°, after which the residue is distilled at a pressure of 11 mm. of mercury. The fraction passing over between 145 and 180° is collected and again distilled at a pressure of 11 mm. of mercury, the fraction distilling between 145 and 155° being collected.

The thus-obtained 1 - methyl-4-amino-N'-(2-thenyl)-piperidine is a colorless, readily mobile liquid which is readily soluble in alcohol and in chloroform and forms two layers with water. Its boiling point is 147–149° at a pressure of 11 mm. of mercury.

The said base forms salts with acids. Thus, for example, the tartrate may be prepared by admixing a solution of 3.0 parts of the base in 300 parts by volume of absolute ethanol at 40° with a solution of 2.4 parts of tartaric acid in 50 parts by volume of absolute alcohol at 60°. After allowing the mixture to stand for two hours at room temperature, the precipitated tartrate is filtered off with suction and is twice recrystallized from methanol. The thus-obtained 1-methyl-4-amino-N'-(2-thenyl)-piperidine tartrate (with water of crystallization) sinters starting at 95° and decomposes at 102–104°.

Example 2

The procedure according to Example 1 is followed, except that the 1-methyl-4-amino-piperidine is replaced by 1 mol of 1-ethyl-4-amino-piperidine. The resultant product is the corresponding 1-ethyl-4-amino-N'-(2-thenyl)-piperidine.

Example 3

The procedure according to Example 1 or Example 2 is followed, except that the 2-thenyl-chloride is replaced by 1 mol of 2-thenyl-bromide. In each case, the same base as that obtained according to the example (1 or 2) is obtained.

Having thus disclosed the invention, what is claimed is:

1. A compound of the formula

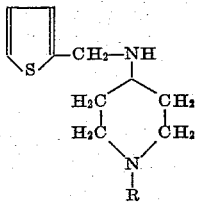

wherein R stands for an alkyl group with 1 to 2 carbon atoms.

2. 1-methyl-4-amino-N'-(2-thenyl)-piperidine.
3. 1-ethyl-4-amino-N'-(2-thenyl)-piperidine.

No references cited.